United States Patent [19]

Kawai et al.

[11] Patent Number: 5,252,876
[45] Date of Patent: Oct. 12, 1993

[54] FREQUENCY GENERATOR AND A D.C. MOTOR EQUIPPED WITH SAME

[75] Inventors: Motoyoshi Kawai, Yonago; Yoshifumi Shimogaki, Tottori; Hideki Shimada, Yonago, all of Japan

[73] Assignee: Matshushita Electric Industrial Co., Ltd., Japan

[21] Appl. No.: 941,895

[22] Filed: Sep. 8, 1992

[30] Foreign Application Priority Data

Sep. 9, 1991 [JP]  Japan .............................. 3-071901[U]

[51] Int. Cl.$^5$ ............................................. H02K 3/00
[52] U.S. Cl. ...................................... 310/184; 310/71; 310/113; 310/268; 310/DIG. 6
[58] Field of Search ............... 310/68 R, 184, DIG. 6, 310/180, 160, 268, 161, 71, 168, 177, 207, 208, 156; 322/58; 318/151-154

[56] References Cited

U.S. PATENT DOCUMENTS

| | | | |
|---|---|---|---|
| 1,426,001 | 8/1922 | Oboukhoff | 310/208 UX |
| 4,093,898 | 6/1978 | Fujita | 310/268 |
| 4,902,923 | 2/1990 | Okauchi | 310/DIG. 6 |
| 5,079,468 | 1/1992 | Sata | 310/168 |
| 5,126,613 | 6/1992 | Choi | 310/208 |

*Primary Examiner*—R. Skudy
*Attorney, Agent, or Firm*—Renner, Otto, Boisselle & Sklar

[57] ABSTRACT

A frequency generator includes a frequency generating magnet, a plurality of generating coils arranged at the polar periphery of the frequency generating magnet, the coils each comprising linear elements located at a distance from the frequency generating magnet such that the linear elements of the coils detect the same magnetic signals at the same time, the coils being crossed with each other, and a plurality of canceling coils provided on one side of the direction in which the generating coils are arranged with respect to the frequency generating magnet, the canceling coils and the generating coils being alternately connected in series.

8 Claims, 1 Drawing Sheet

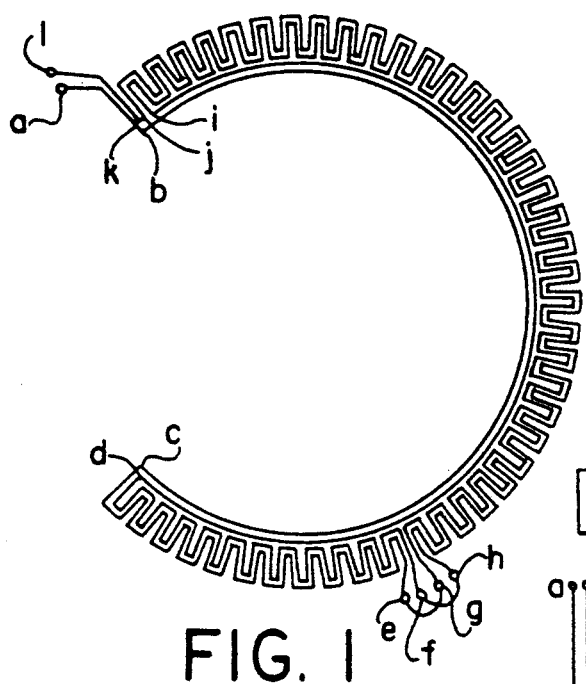
FIG. 1
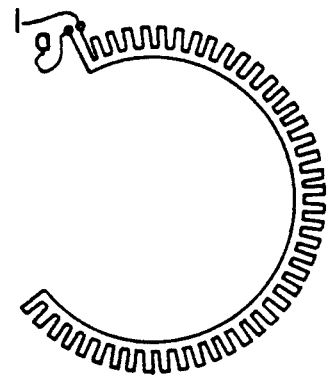
FIG. 5
PRIOR ART
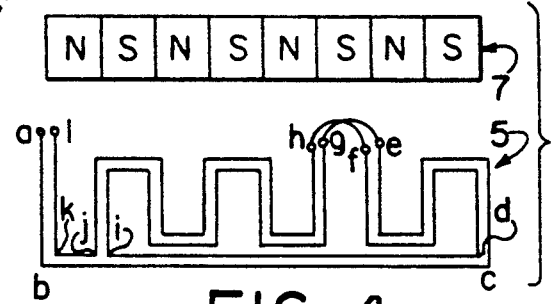
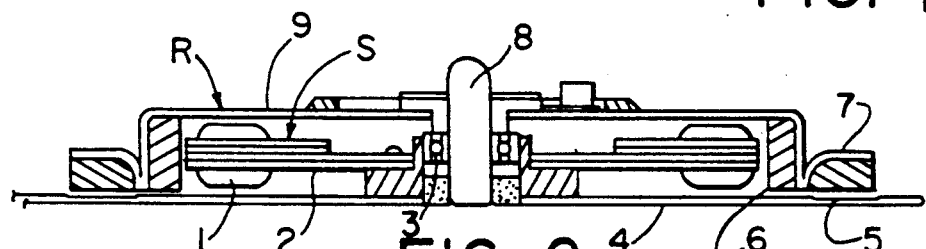
FIG. 4
FIG. 2
PRIOR ART
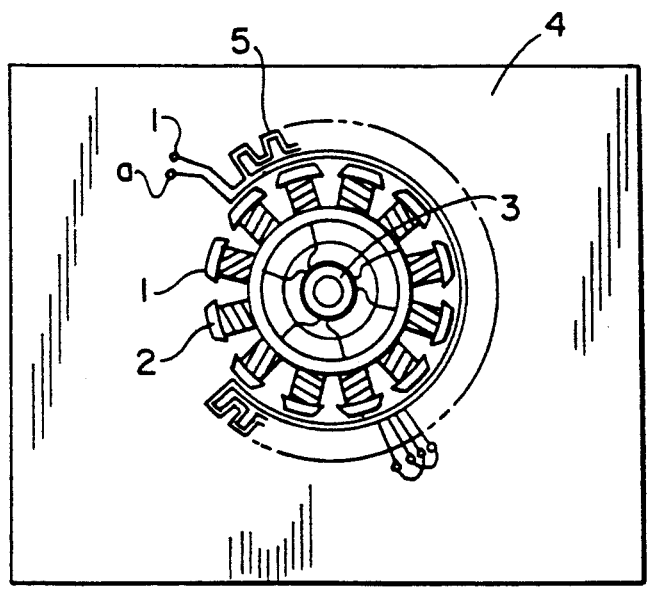
FIG. 3

FREQUENCY GENERATOR AND A D.C. MOTOR EQUIPPED WITH SAME

BACKGROUND OF THE INVENTION

1. Field of the Invention

The present invention relates to a frequency generator for obtaining an optimum frequency in correspondence to the rotating speed of a d.c. motor, and to a d.c. motor equipped with such a frequency generator.

2. Description of the Prior Art

In order to explain a conventional frequency generator, reference will be made to FIG. 2, which is referenced by an embodiment of the present invention. The frequency generator is provided with a stator section S and a rotor section R. The stator section includes a driving coil 1, a stator core 2, a bearing 3, and a printed board 4 having a coil pattern 5 designed to generate a frequency. The rotor section R includes a driving magnet 6, a frequency generating magnet 7, a shaft 8, and a rotor frame 9. FIG. 5 shows a frequency generating coil pattern known in the art. The frequency generating coil pattern is formed in a zigzag pattern. A canceling coil pattern is formed inside the frequency generating coil pattern.

The frequency generator of FIG. 2 operates as follows:

The rotor section R is rotatably supported by the bearing 3 such that it can rotate with respect to the stator section S. The magnetic path of the driving magnet 6 is formed by the rotor frame 9 on one side, and is formed by the printed board 4 and the stator core 2 on the other side. When an electric current flows through the driving coil 1, electromagnetism is generated between the driving coil 1 and the driving magnet 6. The driving coil 1 is formed integrally with the stator core 2, thereby enabling the rotor section R including the driving magnet 6 to rotate as a whole. The rotation of the rotor section R changes a magnetic flux which passes through the coil pattern 5 from the frequency generating magnet 7. An output in proportion to the change in the magnetic flux appears at an output terminal (not shown) of the coil pattern 5 as a speed signal which depends upon the rotating speed of the rotor section R.

Under the prior art system described above, because of the positions of the driving magnet 6 and stator core 2 near the frequency generating coil pattern 5, the magnetic flux from the magnet 6 affects the output of the frequency generating coil pattern 5. This noise based on the magnetic flux prevents the precise rotation of the rotor section, thereby increasing wow flutter. In order to solve such wow flutter problems, the number of the polarizing poles of the magnet 7 and the pattern lines of the coil pattern 5 are increased by integral multiples of the number of polarizing poles of the driving magnet 6, and the inside diameter of the frequency generating coil pattern 5 is enlarged to the extent that it is situated as far as possible radially from the driving magnet 6. However, this method is likely to shorten the effective diameter of the generating pattern lines through which the magnetic flux of the frequency generating magnet 7 passes, thereby decreasing the output of the generating coil. And adversely affecting the signal-to-noise (S/N) ratio.

SUMMARY OF THE INVENTION

According to one aspect of this invention, a frequency generator is provided comprising a frequency generating magnet, a plurality of generating coils arranged about the polar periphery of the frequency generating magnet, each of the generating coils comprising linear elements located at a distance from the frequency generating magnet such that the linear elements of the coils detect the same magnetic signals from the frequency generating magnet at the same time, the generating coils being crossed with each other, and a plurality of canceling coils provided on one side of the direction in which the generating coils are arranged with respect to the frequency generating magnet, the canceling coils and the generating coils being alternately connected in series.

According to another aspect of the present invention, there is provided a d.c. motor including a driving coil disposed in a stator, a driving magnet and a frequency generator, the frequency generator comprising a frequency generating magnet, a plurality of generating coils arranged about a polar periphery of the frequency generating magnet, each coil comprising linear elements located at a distance from the frequency generating magnet such that the linear elements of the coils detect the same magnetic signals from the frequency generating magnet at the same time, the coils being crossed with each other, and a plurality of canceling coils provided radially inward or outward of the generating coils with respect to the frequency generating magnet, the canceling coils and the generating coils being alternately connected in series, the stator being located adjacent the generating coil and each generating coil having the same angular aperture as an angular pitch of a stator core.

Thus, the invention described herein makes possible at least the advantages of (1) providing a frequency generator capable of increasing the output voltage by about twice that obtainable by prior art frequency generators, thereby enhancing the S/N ratio, (2) providing a frequency generator that can ensure the protection of the signals of the frequency generator against magnetic noise, and (3) providing a frequency generator capable of broadening the freedom of design of a d.c. motor in which it is incorporated.

These and other advantages of the present invention will become apparent to those skilled in the art upon reading and understanding the following detailed description with reference to the accompanying figures.

BRIEF DESCRIPTION OF THE DRAWINGS

FIG. 1 is a diagrammatic view showing a frequency generating coil pattern on a printed board used for the present invention;

FIG. 2 is a sectional view showing a d.c. motor equipped with a known frequency generator.

FIG. 4 is an explanatory view exemplifying the principle of the frequency generator according to the present invention; and FIG. 5 is a diagrammatic view showing a known frequency generating coil pattern of the prior art on a printed board.

DESCRIPTION OF THE PREFERRED EMBODIMENTS

Figure 3:
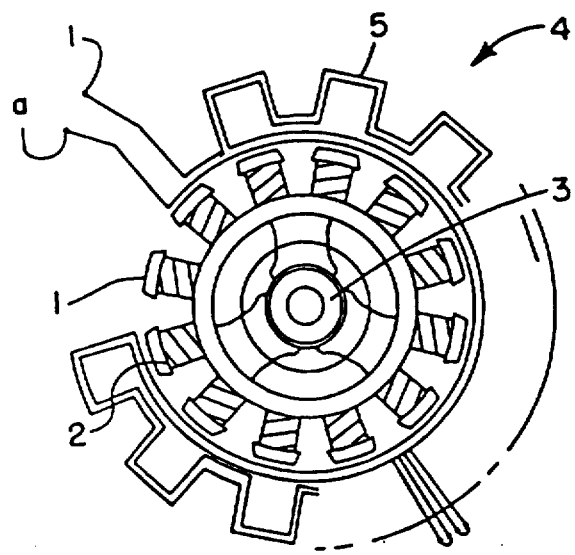
FIG. 3 is a diagrammatic plane view showing a d.c. motor equipped with a frequency generator according to the present invention.

Referring to FIG. 4, the exemplary coil pattern 5 consists of two loops; one loop including a connection from points a, b, c, e, g up to i, and the other including a connection from points i, d, f, h, j, k up to l. The two loops allow an electric current to flow in the same direction, and are connected in series to each other. The two loops are crossed in an electrically insulated manner at a portion from the points e to g and a portion from the points f to h. A coil pattern from the points c, e, g up to the point i is a first generating coil pattern portion, and a coil pattern from the points d, f, h, j, k up to l is a second generating coil pattern portion. A portion from the points b to c is a first canceling coil pattern portion, and a portion from the points i to d is a second canceling coil pattern portion. The first and second generating coil pattern portions are located in the face of the frequency generating magnet 7, and ½ cycle portions of the first generating coil pattern and the first and second generating coil pattern are formed in a zigzag pattern as shown in FIG. 4, wherein each portion takes a rectangular form with a pitch equal to a distance between adjacent poles of the frequency generating magnet 7. The lines of two generating coil pattern portions are formed in parallel at a position where they can be polarized in response to the same signal.

The first canceling coil pattern portion (from point to b point c) and the second canceling coil pattern (from point i to point d) portion are located adjacent to each other inwards of the entire lengths of each generating coil pattern portions. The first generating coil pattern portion, the first canceling coil pattern portion, the second generating coil pattern portion, and the second canceling coil pattern portion are connected in series in this order. The first generating coil pattern portion and the second generating coil pattern portion are connected such that an electric current may flow in an in-phase direction through the printed board. The two generating coil patterns and the two canceling coil patterns are connected in series such that an electric current may flow in an anti-phase direction through the printed board.

Each of the first and second generating coil pattern portions generates voltage through the coil pattern lines under an alternating magnetic field generated by the frequency generating magnet 7. The two generating coil patterns are formed in parallel with each other at a small distance, and connected in series to each other. As a result, the output of a generated voltage at the output terminals at points a and l of each generating coil pattern will amount to about twice that achievable under the known system.

FIG. 1 shows a coil pattern of the present invention obtained by printing the coil pattern arrangement shown in FIG. 4 on the printed board for use in the frequency generator, wherein the first and second generating coil patterns are located outside the first and second canceling coil patterns and wherein the reference letters a-l correspond to like reference letters in FIG. 4 such that the first and second canceling coil patterns are on an inward radial side of the generating coil patterns as shown in FIG. 4.

Referring to FIGS. 2 and 3, a d.c. motor equipped with the frequency generator of the present invention will be described in detail. The exemplary d.c. motor is provided with a stator sections and a rotor section R. The stator section includes a driving coil 1, a stator core 2, a bearing 3, and a printed board 4 having a coil pattern 5. The rotor section includes a driving magnet 6, a frequency generating magnet 7, a shaft 8 and a rotor frame 9. As shown in FIG. 3, the coil pattern 5 has the same angular aperture as the angular pitch of the stator core. Accordingly, each of the apertures corresponding to a ½ cycle portion of the frequency generating coil pattern 5 is aligned with the center of the respective magnetic pole of the stator core 2.

As shown in FIG. 4, the coil pattern 5 is such that each ½ cycle portion of the frequency generating coil pattern 5 has the same pitch as the magnetic poles of the frequency generating magnet 7. In this way, since the first and second frequency generating coil patterns are situated adjacent to each other, and are connected in series, the level of the output voltage can be increased by twice over the known frequency generator.

The first and second canceling coils allow an electric current to flow in an opposite direction to that of the current flowing through those portions of the first and second frequency generating coils that do not participate in the generation of voltage, those portions being indicated by lateral pattern portions in FIG. 4, thereby preventing noise from occurring in these portions, and wherein the first and second canceling coils are arranged in parallel with those portions as shown in FIG. 4. Thus, the speed signals of the frequency generator are protected against an unfavorable influence of magnetic noise. In this way, the S/N ratio of signals from the frequency generator is adequately maintained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A frequency generator comprising a circular frequency generating magnet, a plurality of generating coils, the generating coils being arranged adjacent a polar periphery of the frequency generating magnet, the coils each comprising line elements, the line elements of each coil being arranged to detect simultaneously like magnetic signals from the frequency generating magnet, the coils being crossed with each other, and a plurality of canceling coils provided on one radial side of the generating coils, the canceling coils and the generating coils being alternately connected in series.

2. A frequency generator according to claim 1, wherein the frequency generating magnet, the generating coils and the canceling coils are arranged in a semicircle.

3. A frequency generator according to claim 1, wherein the generating coils and the canceling coils are formed by printing a pattern of said coils on a printed board.

4. A frequency generator according to claim 2, wherein the canceling coils are located radially inward of the generating coils.

5. A frequency generator according to claim 1, wherein the canceling coils are arranged in parallel with those portions of the generating coils that do not participate in generation of voltage by reason of the frequency generating magnet moving relative thereto, and also arranged in an electrically opposite phase to those portions.

6. A d.c. motor including a driving coil disposed in a stator, a driving magnet and a frequency generator, the frequency generator comprising a frequency generating magnet, a plurality of generating coils arranged along the extension of polarity of the frequency generating magnet, each coil comprising linear elements located at a distance from the frequency generating magnet such that the linear elements of the coils detect simultaneously like magnetic signals from the frequency generating magnet, the coils being crossed with each other, and a plurality of canceling coils provided on one side of the generating coils with respect to the arrangement thereof relative to the frequency generating magnet, the canceling coils and the generating coils being alternately connected in series one after another, and the stator being located opposite the generating coils and each generating coil having an angular aperture equal an angular pitch of a stator core.

7. A d.c. motor according claim 6, wherein the driving coil is located inwards of the generating coils and the canceling coils.

8. A d.c. motor according to claim 7, wherein the stator is located opposite the generating coils with a space between each other.

* * * * *

UNITED STATES PATENT AND TRADEMARK OFFICE
CERTIFICATE OF CORRECTION

Page 1 of 2

PATENT NO. : 5,252,876
DATED : October 12, 1993
INVENTOR(S) : Motoyoshi Kawai, et. al.

It is certified that error appears in the above-indentified patent and that said Letters Patent is hereby corrected as shown below:

The drawing sheet, consisting of Fig. 3, should be deleted to be replaced with the drawing sheet, consisting of Fig. 3, as shown on the attached page.

Signed and Sealed this

Twenty-sixth Day of July, 1994

Attest:

BRUCE LEHMAN

Attesting Officer

Commissioner of Patents and Trademarks